No. 627,806. Patented June 27, 1899.
B. F. EARL.
KITCHEN UTENSIL.
(Application filed Sept. 21, 1898.)
(No Model.)

Witnesses:
Richard C. Maxwell,
Wilhelm Vogt

Inventor
Barbara F. Earl,
By J. Walter Douglass
Attorney.

UNITED STATES PATENT OFFICE.

BARBARA F. EARL, OF NORRISTOWN, PENNSYLVANIA, ASSIGNOR OF ONE-HALF TO WILLIAM H. RITTENHOUSE, OF SAME PLACE.

KITCHEN UTENSIL.

SPECIFICATION forming part of Letters Patent No. 627,806, dated June 27, 1899.

Application filed September 21, 1898. Serial No. 691,535. (No model.)

*To all whom it may concern:*

Be it known that I, BARBARA F. EARL, a citizen of the United States, residing at Norristown, in the county of Montgomery and State of Pennsylvania, have invented certain new and useful Improvements in Kitchen Utensils, of which the following is a specification.

My invention has relation to a kitchen utensil especially adapted for the scraping and cleaning of pots, kettles, pans, and the like; and in such connection it relates more particularly to the construction and arrangement of such a utensil.

The principal object of my invention is to provide a kitchen utensil of simple and inexpensive construction, which is adapted to scrape and clean pots, kettles, pans, and the like in a thorough or reliable manner.

My invention, stated in general terms, consists of a kitchen utensil constructed and arranged in substantially the manner hereinafter described and claimed.

The nature and scope of my invention will be more readily understood from the following description when taken in connection with the accompanying drawings, forming part hereof, in which—

Figure 1:
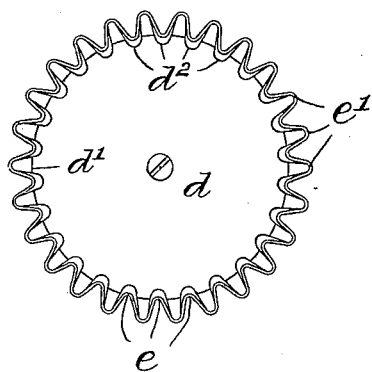
Figure 2:
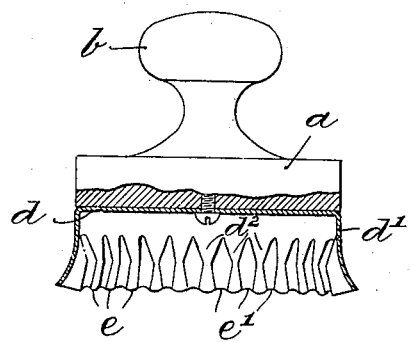
Figure 3:
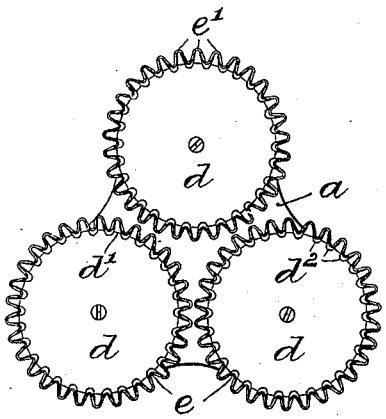

Figure 1 is an underneath plan view of a kitchen utensil embodying the main features of my invention. Fig. 2 is a front elevational view, partly sectioned, of Fig. 1. Fig. 3 is an underneath plan view of a modified form of the utensil shown in Fig. 1, and Fig. 4 is a front elevational view of Fig. 3.

Referring to the drawings, the utensil consists of a base $a$, of wood or other suitable material, and provided, preferably, with a knob-handle $b$. Upon the under face of the base $a$ is secured, by screws or pins or in any suitable manner, as shown in Figs. 1 and 2, a disk $d$, preferably of metal, and formed into a cup and having a downwardly-projecting rim $d'$, of preferably ring shape, which rim is outwardly flared and corrugated or crimped, as at $d^2$, so as to present a series of angular points $e$, which project slightly farther down than the edge $e'$ of said rim.

Figure 4:
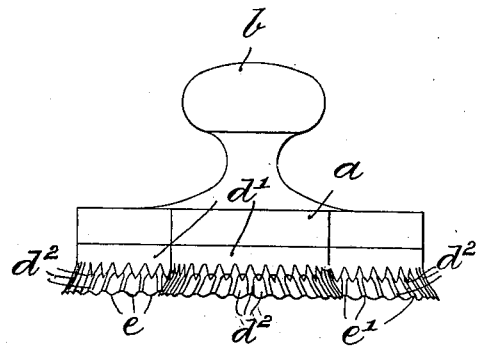

In the modification shown in Figs. 3 and 4 to the base $a$ is secured a series of three cup-shaped disks $d$, which are arranged in an equilateral triangle, and it is manifest that the base $a$ may be provided with any number of the disks $d$, which may be arranged in the form of a square, star, or other form without departing from the spirit of my invention.

The utensil above described is especially adapted for scraping the interior faces of pots, kettles, and pans, the points $e$ scratching the refuse from said interior faces and the crimped rim scraping and removing the refuse thus scratched. The formation of the disks is such that the utensil after use may be readily cleansed by permitting water to flow over, in, and between the disks.

Having thus described the nature and object of my invention, what I claim as new, and desire to secure by Letters Patent, is—

A kitchen utensil, comprising a base $a$, provided with a handle $b$, and cup-shaped disks $d$, on the under side of said base provided with downwardly-projecting outwardly-flaring crimped or corrugated rims $d'$, and said rims having alternate scraping-surfaces and angular projecting scratching-points $e$, adapted to be presented to the article to be scraped or cleaned, substantially as described.

In testimony whereof I have hereunto set my signature in the presence of two subscribing witnesses.

BARBARA F. EARL.

Witnesses:
EUGENE D. EGBERT,
OSCAR WEISS.